United States Patent
Seon (10) Patent No.: US 6,574,755 B1
(45) Date of Patent: Jun. 3, 2003

(54) METHOD AND PROCESSING FAULT ON SCSI BUS

(75) Inventor: Min Kyu Seon, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/470,980

(22) Filed: Dec. 23, 1999

(30) Foreign Application Priority Data

Dec. 30, 1998 (KR) .............................. 98-62388

(51) Int. Cl.[7] .................................................. G08F 11/00
(52) U.S. Cl. .............................. 714/56; 714/4; 710/108
(58) Field of Search .......................... 714/43, 56, 4, 714/17; 710/108

(56) References Cited

U.S. PATENT DOCUMENTS

| | | | | |
|---|---|---|---|---|
| 4,845,614 A | * | 7/1989 | Hanawa et al. ................ 714/16 |
| 5,392,425 A | * | 2/1995 | Elliott et al. .................. 714/16 |
| 6,125,454 A | * | 9/2000 | Mossner et al. ................ 714/4 |
| 6,240,467 B1 | * | 5/2001 | Beardsley et al. .......... 709/200 |
| 6,247,077 B1 | * | 6/2001 | Muller et al. .................. 710/74 |
| 6,253,273 B1 | * | 6/2001 | Blumenau .................... 709/104 |
| 6,292,910 B1 | * | 9/2001 | Cummins .................... 709/107 |
| 6,397,279 B1 | * | 5/2002 | Jaramillo et al. ........... 710/105 |

* cited by examiner

*Primary Examiner*—Robert Beausoliel
*Assistant Examiner*—Marc Duncan
(74) *Attorney, Agent, or Firm*—Fleshner & Kim, LLP (57) ABSTRACT

A method for processing a SCSI bus fault in a SCSI system which has an initiator device and a target device interconnected via a SCSI bus. In response to a control command, the initiator device requests the target device to execute a specific SCSI command. Then, the initiator device processes a normal script phase in response to the SCSI command to transfer the SCSI command to the target device over the SCSI bus. If the fault occurs on the SCSI bus while the SCSI command is transferred to the target device, the initiator device retries the transfer of the SCSI command to the target device a predetermined number of times. Therefore, data damage in the target device due to the SCSI bus fault can be reduced to a minimum.

16 Claims, 6 Drawing Sheets

METHOD AND PROCESSING FAULT ON SCSI BUS

BACKGROUND OF THE INVENTION

1. Field of the Invention

The present invention relates to processing data on a small computer system interface (SCSI) bus, and more particularly to a method for processing a fault or error on a SCSI bus which reduces damage to a target device.

2. Background of the Related Art

A small computer system interface (SCSI) is an interface unit which performs data input/output operations with a very low dependency on a central processing unit (CPU). In this regard, the SCSI has often been used in a personal computer or a voice mail communication system (VMS) due to increased data transfer rate. However, different types of communication equipment have been developed with a variety of interfaces, and it has been necessary for the user to bear the expense of new or updated interfaces with each development.

In order to overcome such a problem, the SCSI has been standardized and developed in such a way that a high-order standard is compatible with a low-order standard. As a result, because most SCSI peripheral devices are compatible with a host adaptor, they are interconnectable regardless of a system environment. Such a SCSI has been named a variety of terms (SCSI-1, SCSI-2, Fast SCSI-2, Ultra, Ultra Wide and Ultra2 Wide) according to its standards. The following table 1 shows points of difference among the SCSI standards.

TABLE 1

| STANDARD | SCSI-1 | SCSI-2 | Fast SCSI-2 | Ultra | Ultra Wide | Ultra2 Wide |
|---|---|---|---|---|---|---|
| MAXIMUM SPEED | 5MB/s | 5MB/s | 10MB/s | 20MB/s | 40MB/s | 80MB/s |
| BUS WIDTH | 8 Bit | 8 Bit | 8 Bit | 8 Bit | 16 Bit | 16 Bit |
| CABLE LENGTH | 6M | 6M | 3M | 3M | 1.5–3M | 12M |

Figure 1:
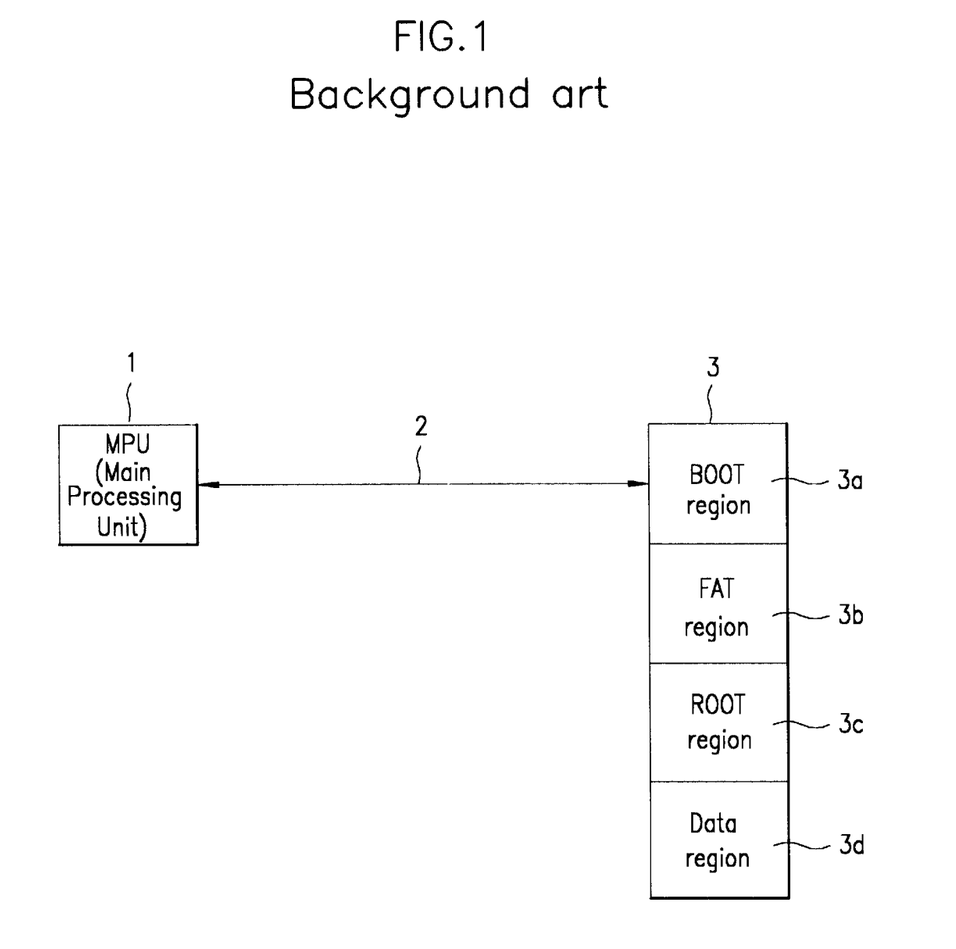
FIG. 1 is a block diagram showing the construction of a related art SCSI system.

FIG. 1 is a block diagram showing the construction of a related art SCSI system wherein a main processing unit (MPU) 1 and a hard disk 3 are interconnected via a SCSI bus 2. The MPU 1 essentially comprises a CPU, a memory and a SCSI card.

The hard disk 3 is partitioned into a boot region 3a, a file allocation table (FAT) region 3b, a root region 3c and a data region 3d. The boot region 3a is provided to run a program, and the FAT region 3b is a table for storing file information in an allocated area of the data region 3d. The root region 3c is provided to indicate a path of the hard disk 3 on which a specific file is located, and the data region 3d is adapted to actually store the file information.

In the above-mentioned SCSI system, the MPU 1 can transfer a write or read command to the hard disk 3 over the SCSI bus 2 or receive read data from the hard disk 3 over the SCSI bus 2 according to a specific application. During this process, a fault may occur on the SCSI bus 2 due to noise, poor hard disk connection, no response, etc. In such instances, the CPU in the MPU 1 typically returns a data transfer error value and displays it on a screen. If the CPU in the MPU 1 returns an error value resulting from a fault on the SCSI bus 2, a sector area of the target device executing a specific SCSI command may be subjected to fatal damage.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention to provide a method for processing a fault on a SCSI bus that substantially obviates one or more of the problems caused by the disadvantages of the related art.

Another object of the present invention is to reduce damage to data stored on a target device.

Another object of the present invention is to provide a method of processing a fault on a SCSI bus in which when the fault occurs on the SCSI bus while a specific SCSI command is transferred over the SCSI bus between an initiator device (for example, a main processing unit) and target device (for example, a hard disk) in a SCSI system, data damage in the target device due to the SCSI bus fault can be reduced to a minimum.

To achieve at least the above objects in whole or in parts, and in accordance with embodiments of the present invention, in a SCSI system which has an initiator device and a target device interconnected via a SCSI bus, there is provided a method for processing a fault on the SCSI bus, comprising the steps of allowing the initiator device to request the target device to execute a specific SCSI command in response to a user's control command; allowing the initiator device to process a normal script phase in response to the SCSI command to transfer the SCSI command to the target device over the SCSI bus; and allowing the initiator device to retry the transfer of the SCSI command to the target device a first predetermined number of times if the fault occurs on the SCSI bus while the SCSI command is transferred to the target device.

To further achieve the above-described objects of the present invention in a whole or in parts, there is provided a method for processing data on a SCSI bus, including the steps of a) requesting execution of a prescribed SCSI command in response to a control command, b) processing a script phase to transfer the SCSI command to a target device over the SCSI bus, and c) retrying the transfer of the SCSI command to the target device for a first prescribed number of times if an error occurs on the SCSI bus while the SCSI command is transferred to the target device.

To further achieve the above-described objects of the present invention in a whole or in parts, there is provided a method for processing data on a SCSI bus, including the steps of a) transferring a command over the SCSI bus to a target device to execute a SCSI command in response to a control command, b) determining whether the execution of the SCSI command has been normally completed, and c) repeating steps a) and b) for a first prescribed number of times if it is determined that the SCSI command has not been normally executed.

To further achieve the above-described objects of the present invention in a whole or in parts, there is provided a method for processing data on a SCSI bus, including the steps of a) resetting an input/output complete flag, b) transferring a command over the SCSI bus to a target device to execute a SCSI command in response to a control command, c) setting an input/output complete flag at a SCSI interrupt service routine, d) disabling an interrupt to prevent task switching between an input/output complete flag checking operation and an input/output cancellation operation, and e) performing the input/output complete flag checking operation.

To further achieve the above-described objects of the present invention in a whole or in parts, there is provided a small computer system interface (SCSI), including a first main processing unit, a second main processing unit coupled to the first main processing unit, a redundant array of independent disks (RAID) controller coupled to the first and second main processing units, and a plurality of memory storage devices coupled to the RAID controller, wherein the RAID controller is coupled to the first and second main processing units and the plurality of memory storage devices by a SCSI bus.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
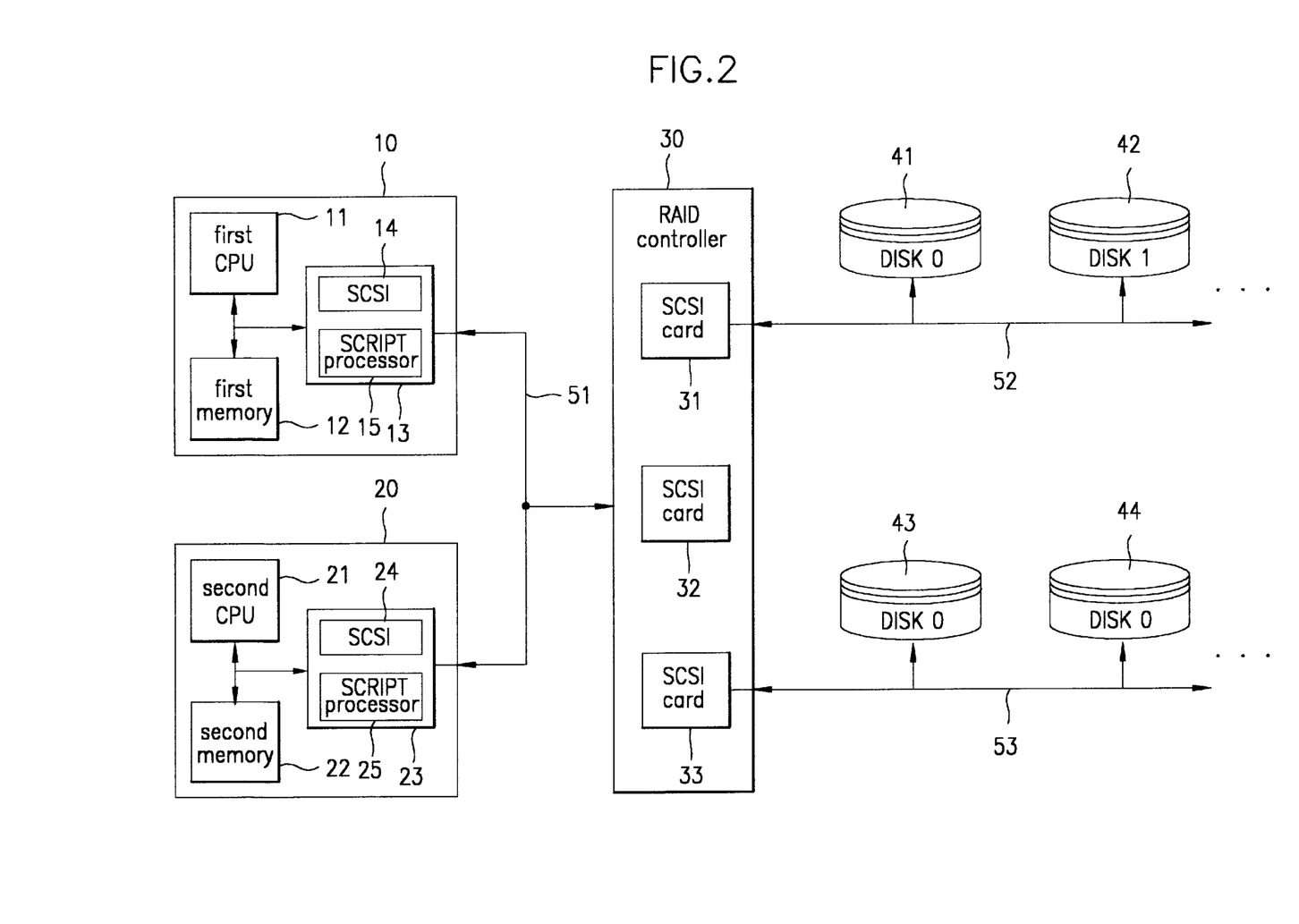
FIG. 2 is a block diagram showing the construction of a SCSI system in accordance with the preferred embodiment of the present invention.

With reference to FIG. 2, a SCSI system is shown in block form in accordance with the preferred embodiment of the present invention. As shown in this drawing, the SCSI system comprises a first main processing unit 10 including a first CPU 11, a first memory 12 and a first SCSI card 13. The system further comprises a second main processing unit 20 including a second CPU 21, a second memory 22 and a second SCSI card 23.

A redundant array of inexpensive or independent disks (RAID) controller 30 is connected to the first and second main processing units 10 and 20 via a SCSI bus 51. The RAID controller 30 preferably includes three SCSI cards 31–33 and is adapted to enhance disk stability and performance through data mirroring and data striping. A plurality of hard disks 41, 42, etc., is connected to the RAID controller 30 via a SCSI bus 52, and a plurality of hard disks 43, 44, etc., is connected to the RAID controller 30 via a SCSI bus 53.

When the first MPU 10 sends a specific SCSI command to the hard disk 41 over the SCSI bus 51, the first MPU 10 becomes an initiator device for requesting a SCSI device (or target device) to perform input/output processes, and the hard disk 41, for example, becomes the target device for performing the input/output processes requested by the initiator device.

Each of the SCSI cards 13, 23, 31, 32 and 33 performs a SCSI protocol and has a unique identifier (ID) based on an associated SCSI bus channel. For example, the SCSI ID of the SCSI card 13 on the host SCSI bus 51 may be 7, the SCSI ID of the SCSI card 23 thereon may be 6, and the SCSI ID of the SCSI card 32 thereon may be any one of 0 to 5. Also by way of example, the SCSI ID of the SCSI card 31 on the target SCSI bus 52 may be 7 and the SCSI ID of each of the disks 41 and 42 may be any one of 0 to 6. The SCSI ID of the SCSI card 33 on the target SCSI bus 53 may be 7 and the SCSI ID of each of the disks 43 and 44 may be any one of 0 to 6.

In the present invention, a fault occurring on a SCSI bus may be processed by the software. In such a case, the SCSI bus may preferably be of either the SCSI-1 type or SCSI-2 type and preferably adopt any one of asynchronous and synchronous transfer modes. Further, the connection to the host SCSI bus 51 may be modified. For example, although the host SCSI bus 51 is shown in FIG. 2 to interconnect the two MPUs 10 and 20 and the RAID controller 30, it may connect a single MPU directly to the hard disks 41, 42, etc. or 43, 44, etc.

Types of faults occurring on a SCSI bus are as follows:

(1) The first fault type is a SCSI bus busy state where the SCSI bus is timed out because an MPU cannot be synchronized with an acknowledge signal due to instability of a request signal to a target device. The SCSI bus busy state can be recognized when there is no response for 10 seconds after an operation associated with a specific SCSI command is normally completed with no abnormal error by the MPU.

(2) The second fault type is an unexpected disconnect state of the target device where the SCSI target device acts to release the SCSI bus control to enhance performance of the MPU.

(3) The third fault type is a device not ready state where access is attempted when the target device is not ready.

(4) The fourth fault type is a unit attention state where access is attempted just after the target device is reset.

Figure 3:
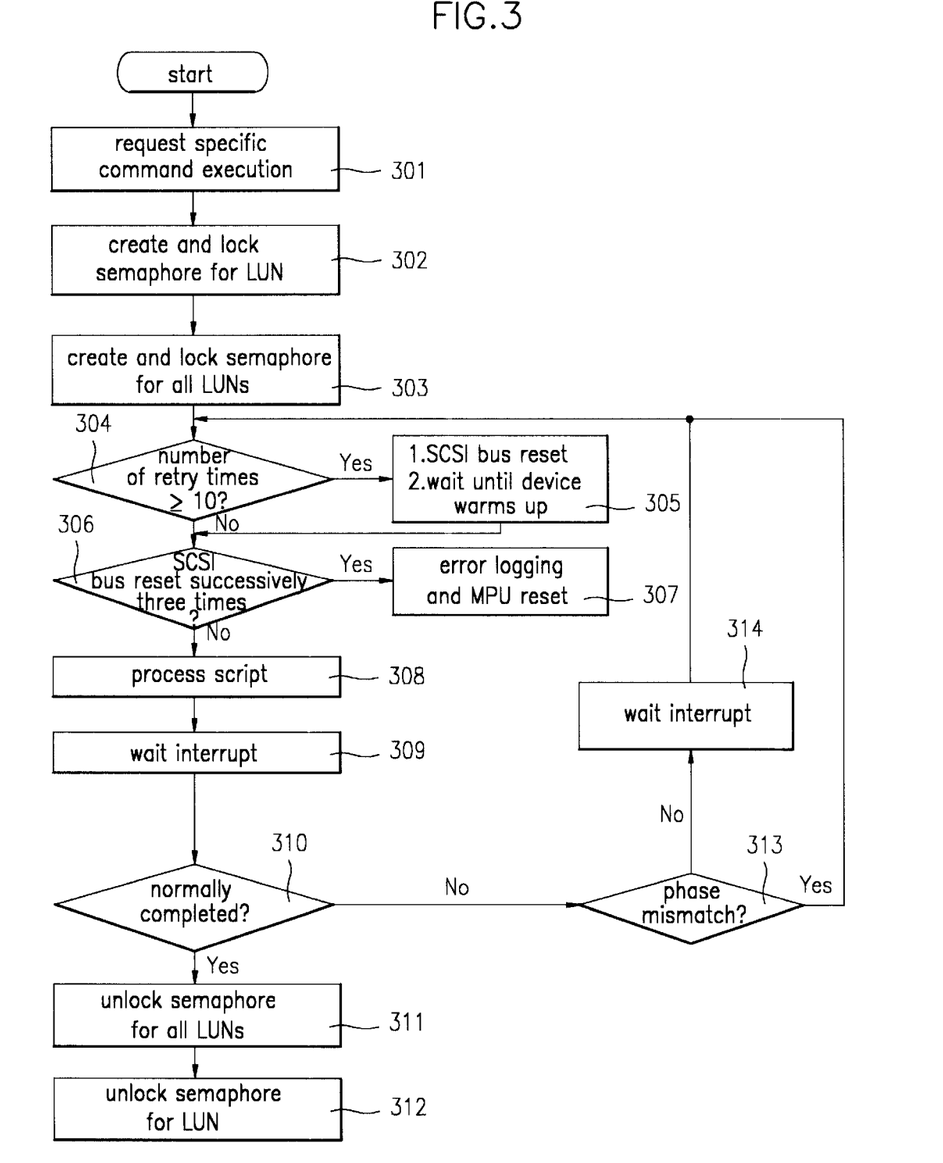
FIG. 3 is a flowchart illustrating a procedure of retrying the transfer of a SCSI command to a target device when a fault occurs on a SCSI bus while the SCSI command is transferred to the target device over the SCSI bus, in accordance with the preferred embodiment of the present invention.

FIG. 3 is a flowchart illustrating a procedure of retrying the transfer of a SCSI command to a target device when a fault occurs on a SCSI bus while the SCSI command is transferred to the target device over the SCSI bus, in accordance with the preferred embodiment of the present invention. Assuming that the first MPU 10 in FIG. 2 is the initiator device and the hard disk 41 is the target device, the procedure of FIG. 3 is performed when a fault (error) occurs on the host SCSI bus 51 while the initiator device sends a specific SCSI command to the target device over the host SCSI bus 51.

First, at step 301, the first CPU 11 in the first MPU 10 requests the target device to execute a specific SCSI command. For example, this can be precipitated by a user control command. Then, for inter-task mutual exclusion assurance and data security, the first CPU 11 creates and locks a semaphore for each logical unit number at step 302. Also, for ensuring unification of disk resource occupancy, the first CPU 11 creates and locks a semaphore for all of the logical unit numbers at step 303.

Then, the first CPU 11 determines at step 304 whether the number of times that it retries transferring the SCSI command to the target device is preferably greater than or equal to 10. If it is determined at step 304 that the number of retries is fewer than 10, the first CPU 11 determines at step 306 whether the SCSI bus 51 has been reset successively three times. Upon determining at step 306 that the SCSI bus 51 has been reset successively three times, the first CPU 11 performs an error logging operation for future error analysis and resets the first MPU 10 at step 307.

However, if the SCSI bus 51 has not been reset successively three times, the first CPU 11 controls the SCSI card 13 to process a normal script phase at step 308. The script is a machine code which is executed by a script processor 15 in the SCSI card 13. The phase includes a series of steps for performing the SCSI protocol. The phase steps are bus free, arbitration, selection/reselection, command, data in/out, status and message in/out.

At the above step 304, the number of times to retry the transfer of the SCSI command to the target device when a fault occurs on the SCSI bus is preferably 10. Thus, if the fault occurs on the SCSI bus successively ten times or more, the first CPU 11 resets the SCSI bus 51 and initializes a SCSI register 14 in the SCSI card 13 at step 305. Also at step 305, the first CPU 11 waits until the RAID controller 30 warms up and then retries transferring the SCSI command to the target device. Preferably, when ten seconds have elapsed after the SCSI bus 51 is reset, a timer interrupt service routine (ISR) resumes a driver of the SCSI card 13 (namely, the above step 306).

Thereafter, the first CPU 11 waits for a script interrupt instruction received (SIR) interrupt at a SCSI interrupt service routine (ISR) at step 309. If the interrupt is set, the initiator device determines at step 310 that the execution of the SCSI command has normally been completed. Then, the initiator device unlocks the semaphore created and locked for each of the logical unit numbers and the semaphore created and locked for all of the logical unit numbers at steps 312 and 311, respectively.

However, upon determining at the above step 310 that the execution of the SCSI command has not normally been completed and that a fault has occurred on the SCSI bus 51, the initiator device retries transferring the SCSI command to the target device. Namely, the first CPU 11 determines at step 313 whether the fault results from phase mismatch. If the fault is determined to result from the phase mismatch at step 313, the first CPU 11 recognizes that the fault is not a SCSI bus fault and thus returns to the above step 304 directly without aborting the SCSI bus 51.

Alternatively, if it is determined at step 313 that the fault does not result from the phase mismatch, the first CPU 11 causes the SCSI bus 51 to abort the retry of the SCSI command transfer, and then waits for the interrupt at step 314. Upon receiving the interrupt, the first CPU 11 returns to the above step 304 directly without aborting the SCSI bus 51.

If the initiator includes a pair of MPUs 10 and 20 as shown in FIG. 2, and it is determined at the above step 306 that the SCSI bus 51 has been reset successively three times, the control program may be switched to the paired MPU 20 so that the MPU 20 can execute the next command.

Figure 4:
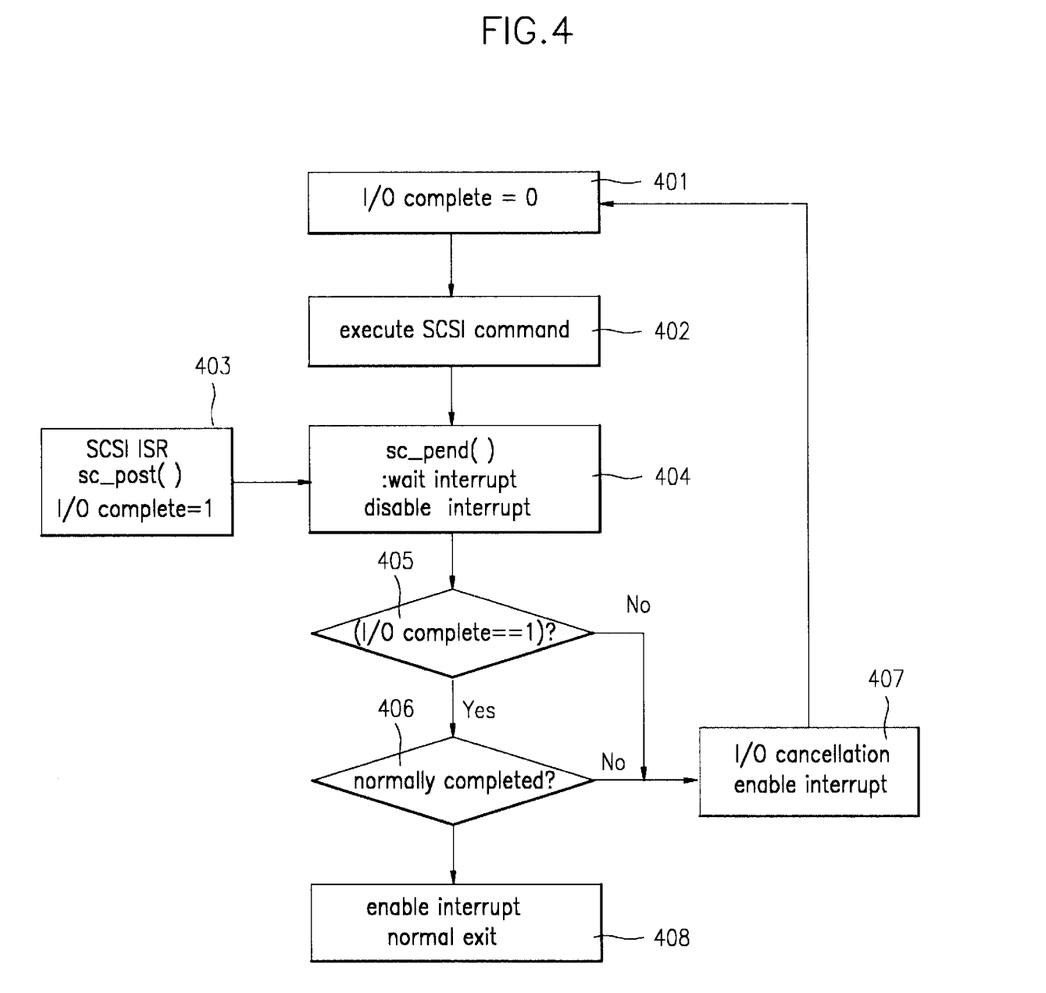
FIG. 4 is a flowchart illustrating a procedure of, when the fault occurs on the SCSI bus while the SCSI command is executed, retrying the transfer of the SCSI command to the target device after input/output operations in progress are completed, in accordance with the preferred embodiment of the present invention.

FIG. 4 is a flowchart illustrating a procedure of retrying the transfer of the SCSI command to the target device after input/output operations in progress are completed, when the fault occurs on the SCSI bus while the SCSI command is executed, in accordance with the preferred embodiment of the present invention.

First, at step 401, for ensuring input/output (I/O) completion, the first CPU 11 preferably resets an input/output (I/O) complete flag before executing the SCSI command at step 402. Then, the first CPU 11 sets the I/O complete flag only at the SCSI ISR at step 403. Hence, even though a SCSI interrupt pending interval is timed out, the reconnection to the SCSI bus is possible after the I/O completion. At this time, the interrupt is disabled at step 404 so that there can be no task switching between an I/O complete flag checking operation at step 405 and an I/O cancellation operation at step 407 because they are automatic operations.

Then, the first CPU 11 determines at step 406 whether the execution of the SCSI command has normally been completed. Upon determining at step 406 that the execution of the SCSI command has normally been completed, the first CPU 11 enables the interrupt and exits at step 408. However, in the case where the execution of the SCSI command has not normally been completed, the first CPU 11 performs the I/O cancellation operation, enables the interrupt and then returns to the above step 401.

Figure 5:
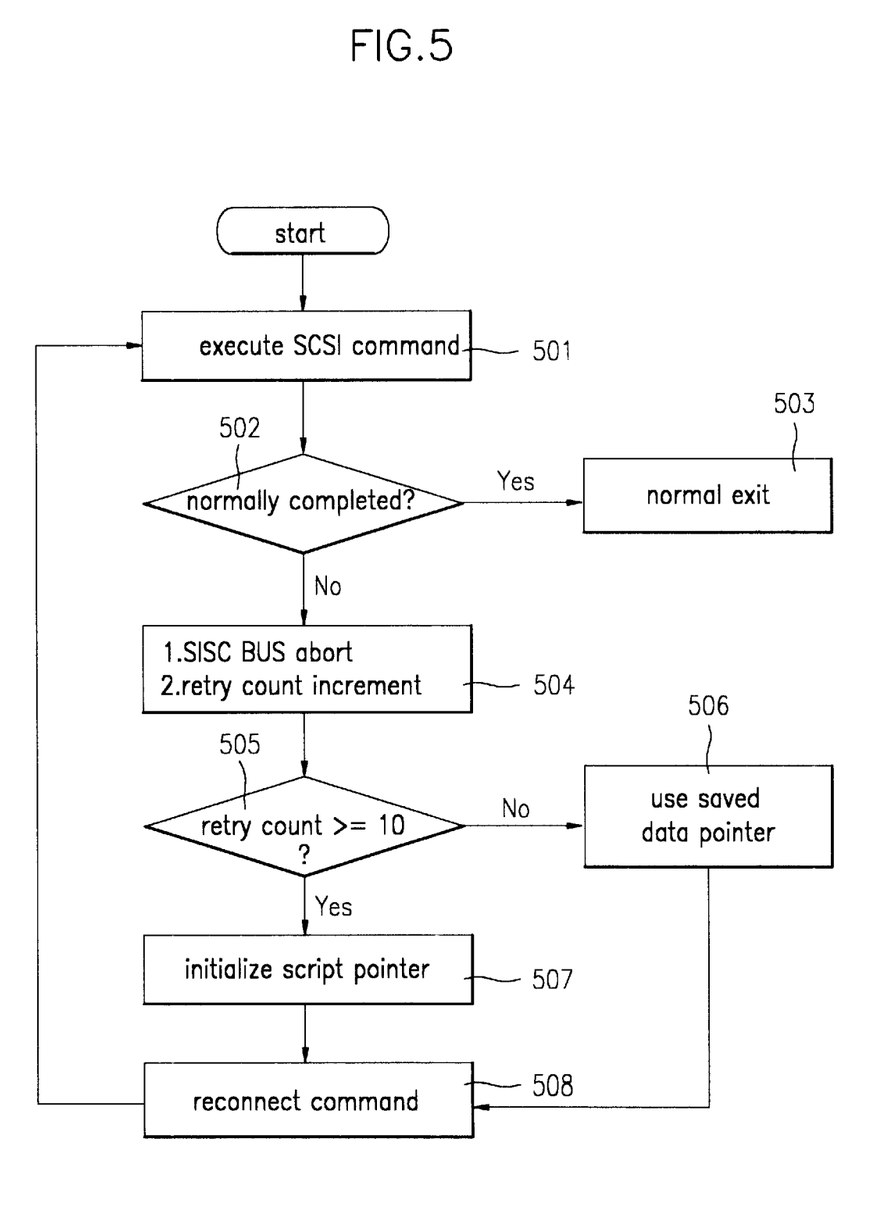
FIG. 5 is a flowchart illustrating a procedure of controlling a script data pointer on the basis of a SCSI command transfer retry count in accordance with the preferred embodiment of the present invention.

FIG. 5 is a flowchart illustrating a procedure of controlling a script data pointer on the basis of a SCSI command transfer retry count in accordance with the preferred embodiment of the present invention. During this procedure, the first CPU 11 preferably maintains or changes the data pointer according to the number of retries of the transfer of the SCSI command to the target device.

To this end, the first CPU 11 preferably executes the SCSI command at step 501 and then determines at step 502 whether the execution of the SCSI command has normally been completed. If it is determined at step 502 that the execution of the SCSI command has not normally been completed, the first CPU 11 aborts the SCSI bus and increments the retry count at step 504. Then, the first CPU 11 determines at step 505 whether the retry count is greater than or equal to 10, preferably. If the retry count is greater than or equal to 10, the first CPU 11 resets the SCSI bus 51 at step 507 to clear the data pointer of the target device. As a result, the data pointer is changed to the initial value and the transfer of the SCSI command to the target device is retried on the basis of the changed data pointer at step 508.

However, if it is determined at the above step 505 that the retry count is less than 10, the first CPU 11 retries the transfer of the SCSI command to the target device using a saved data pointer at step 506, which is received from the target device upon disconnection. Therefore, in the case where the initiator device transfers the SCSI command to the target device over the host SCSI bus 51, it is able to ensure data continuity even when a fault occurs on the SCSI bus.

Figure 6:
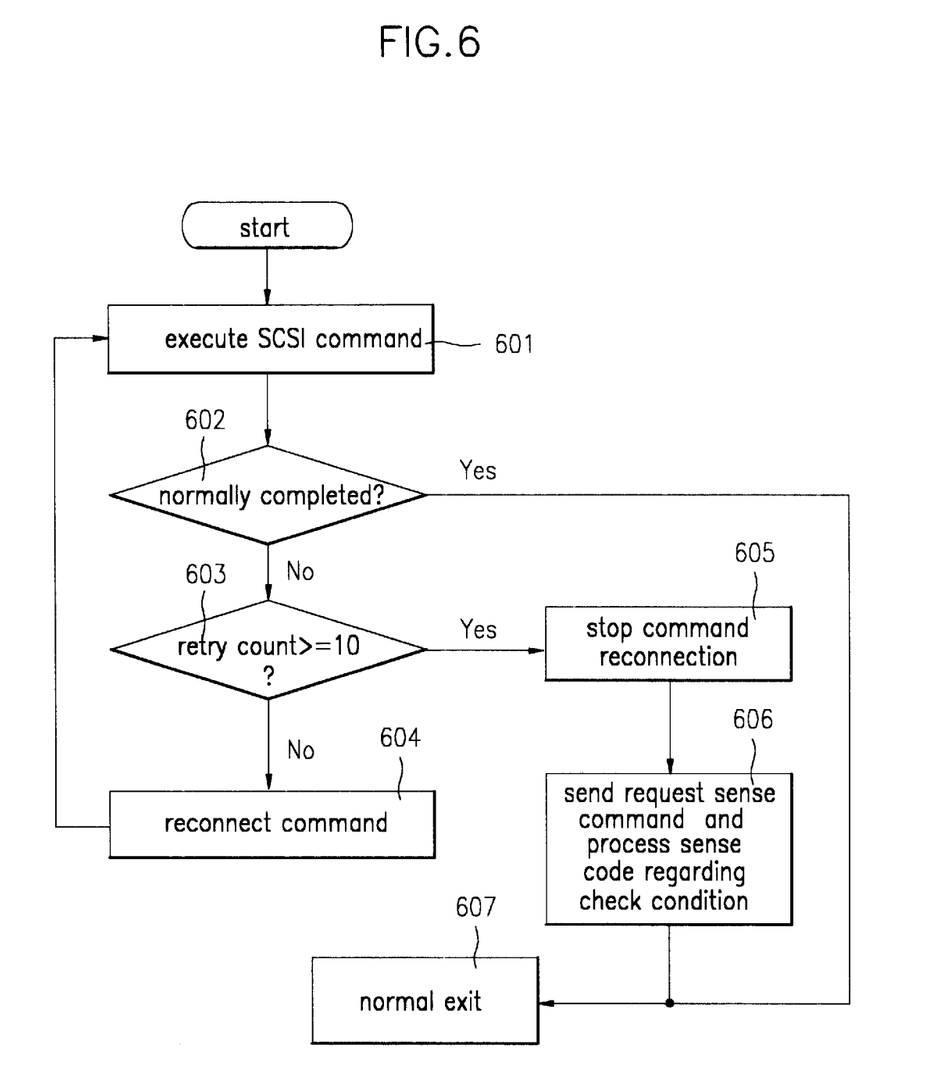
FIG. 6 is a flowchart illustrating a procedure of processing a check condition which is an exceptional error case, in accordance with the preferred embodiment of the present invention.

FIG. 6 is a flowchart illustrating a procedure of processing a check condition which is an exceptional error case, in accordance with the preferred embodiment of the present invention. During these procedures, the first CPU 11 preferably executes the SCSI command at step 601 and then determines at step 602 whether the execution of the SCSI command has been normally completed. If it is determined at step 602 that the execution of the SCSI command has been normally completed, the first CPU 11 normally exits at step 607. However, upon determining at step 602 that the execution of the SCSI command has not been normally completed, the first CPU 11 determines at step 603 whether the SCSI command transfer retry count is preferably greater than or equal to 10.

If the retry count is less than 10, the first CPU 11 retries the transfer of the SCSI command to the target device at step 604. If, however, the retry count is greater than or equal to 10, the first CPU 11 determines whether a SCSI ISR transfer code indicates the check condition. The check condition normally occurs at a device not ready state, a medium error state, a hardware error state, a unit attention state, or a data protect state. If the SCSI ISR transfer code indicates the check condition, the first CPU 11 stops retrying the transfer of the SCSI command to the target device at step 605. Then, at step 606, the first CPU 11 sends a request sense command to the target device and receives a sense code regarding the check condition from the target device. Also, at step 606, the first CPU 11 traces the origin of the error resulting in the check condition, and then normally exits at step 607.

As described above, according to the preferred embodiment of the present invention, when a fault occurs on a SCSI bus while a SCSI command is executed, the SCSI command is reconnected to the SCSI bus and the transfer thereof is retried until the execution of the SCSI command is normally completed. In the case where the preferred embodiment of the present invention is applied to a voice mail system or a personal computer, data damage in a target device due to a SCSI bus fault can be reduced to a minimum even though the SCSI bus fault occurs while a specific SCSI command is executed. Therefore, the present invention has the effect of enhancing stability and reliability of the entire system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing data on a SCSI bus, comprising the steps of:
   a) requesting execution of a prescribed SCSI command in response to a control command;
   b) processing a script phase to transfer the SCSI command to a target device over the SCSI bus;
   c) retrying the transfer of the SCSI command to the target device for a first prescribed number of times if an error occurs on the SCSI bus while the SCSI command is transferred to the target device;
   d) creating and locking a semaphore for each logical unit number assigned to each unit in the SCSI system and a semaphore for all of the logical unit numbers after step a) is performed;
   e) determining whether the number of times of retrying the transfer of the SCSI command to the target device is greater than or equal to the first prescribed number of times after step d) is performed; and
   f) if it the number of times of retrying the transfer of the SCSI command to the target device is less than the first prescribed number of times, determining whether the SCSI bus has been reset a second prescribed number of times or more and returning to step b) if said SCSI bus has not been reset the second prescribed number of times or more.

2. The method of claim 1, wherein said step f) further includes the step of resetting the SCSI bus if it is determined at said step e) that the number of times of retrying the transfer of the SCSI command to the target device is greater than or equal to the first prescribed number of times.

3. The method of claim 1, wherein said step f) further includes the step of performing an error logging operation and reset operation if the SCSI bus has been reset the second prescribed number of times or more.

4. The method of claim 1, wherein the error on the SCSI bus includes one of a SCSI bus busy state where the SCSI bus is timed out because an initiator device cannot be synchronized with an acknowledge signal due to instability of a request signal to the target device, an unexpected disconnect state of the target device, a device not ready state where access is attempted while the target device is not ready, and a unit attention state where access is attempted just after the target device is reset.

5. The method of claim 4, wherein the SCSI bus busy state is a state where there is no response for a predetermined period of time after the execution of the SCSI command is normally completed with no abnormal error by the initiator device.

6. A method for processing data on a SCSI bus, comprising:
   a) requesting execution of a prescribed SCSI command in response to a control command;
   b) processing a script phase to transfer the SCSI command to a target device over the SCSI bus;
   c) retrying the transfer of the SCSI command to the target device for a first prescribed number of times if an error occurs on the SCSI bus while the SCSI command is transferred to the target device;
   d) waiting for an interrupt after said step b) is performed; and
   e) determining whether the execution of said SCSI command has been normally completed.

7. The method of claim 6, further comprising the step of:
   f) unlocking a semaphore created and locked for each logical unit number assigned to each unit in the SCSI system and a semaphore created and locked for all of the logical unit numbers if it is determined at said step e) that the execution of the SCSI command has normally been completed.

8. The method of claim 6, further comprising the steps of:
   f) determining whether the error results from a phase mismatch, if it is determined at said step e) that the execution of the SCSI command has not been normally completed; and
   g) one of returning to said step b) if the error results from the phase mismatch, and waiting for the interrupt before returning to said step b) if the error does not result from the phase mismatch.

9. A method for processing data on a SCSI bus, comprising:
   a) transferring a command over the SCSI bus to a target device to execute a SCSI command in response to a control command;
   b) determining whether the execution of the SCSI command has been normally completed; and
   c) repeating steps a) and b) for a first prescribed number of times if it is determined that the SCSI command has not been normally executed, wherein if it is determined that the SCSI command has not been normally executed, step b) further comprises one of maintaining and changing a data pointer, depending on the number of times the transfer of the SCSI command to the target device is retried.

10. A method for processing data on a SCSI bus, comprising:

a) transferring a command over the SCSI bus to a target device to execute a SCSI command in response to a control command;

b) determining whether the execution of the SCSI command has been normally completed; and c) repeating steps a) and b) for a first prescribed number of times if it is determined that the SCSI command has not been normally executed, wherein if it is determined that the SCSI command has not been normally executed, step b) includes the further steps of (i) aborting the SCSI bus and incrementing a retry count, (ii) determining whether the retry count is greater than or equal to the first prescribed number of times, and (iii) if the retry count is greater than or equal to the first prescribed number of times, resetting the SCSI bus and changing a data pointer to an initial value, and if the retry count is less than the first prescribed number of times, maintaining the data pointer with a saved value received from the target device upon disconnection.

11. A method for processing data on a SCSI bus, comprising:

a) transferring a command over the SCSI bus to a target device to execute a SCSI command in response to a control command;

b) determining whether the execution of the SCSI command has been normally completed; and c) repeating steps a) and b) for a first prescribed number of times if it is determined that the SCSI command has not been normally executed, wherein if it is determined that the SCSI command has not been normally executed, step b) includes the further steps of (i) incrementing a retry count, (ii) determining whether the retry count is greater than or equal to the first prescribed number of times, (iii) if the retry count is greater than or equal to the first prescribed number of times, determining whether a SCSI interrupt service routine transfer code indicates a check condition, and (iv) if the SCSI interrupt service routine transfer code indicates the check condition, stop retrying the transfer of the SCSI command to the target device, sending a request sense command to the target device, and receiving a sense code regarding the check condition from the target device and tracing the origin of an error resulting in the check condition.

12. The method of claim 11, wherein the check condition occurs at any one of a device not ready state, a medium error state, a hardware error state, an unit attention state, and a data protect state.

13. A method for processing data on a SCSI bus, comprising the steps of:

a) resetting an input/output complete flag;

b) transferring a command over the SCSI bus to a target device to execute a SCSI command in response to a control command;

c) setting an input/output complete flag at a SCSI interrupt service routine;

d) disabling an interrupt to prevent task switching between an input/output complete flag checking operation and an input/output cancellation operation; and e) performing the input/output complete flag checking operation.

14. The method of claim 13, wherein if the input/output flag checking operation indicates that the input/output is not complete, step e) includes the further steps of (i) performing an input/output cancellation operation, (ii) enabling the interrupt; and (iii) returning to said step a).

15. The method of claim 13, wherein if the input/output flag checking operation indicates that the input/output is complete, step e) includes the further steps of (i) determining whether the execution of the SCSI command has been normally completed, and if SCSI command has not been normally completed, (ii) performing an input/output cancellation operation, (iii) enabling the interrupt; and (iv) returning to said step a).

16. The method of claim 13, wherein if the input/output flag checking operation indicates that the input/output is complete, step e) includes the further steps of (i) determining whether the execution of the SCSI command has been normally completed, and if SCSI command has been normally completed, (ii) exiting normally.

* * * * *